(12) United States Patent
Yadav

(10) Patent No.: US 6,895,590 B2
(45) Date of Patent: May 17, 2005

(54) METHOD AND SYSTEM ENABLING BOTH LEGACY AND NEW APPLICATIONS TO ACCESS AN INFINIBAND FABRIC VIA A SOCKET API

(75) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 09/965,265

(22) Filed: Sep. 26, 2001

(65) Prior Publication Data

US 2003/0061402 A1 Mar. 27, 2003

(51) Int. Cl.⁷ ................................................ G06F 3/00
(52) U.S. Cl. ...................... 719/328; 709/246; 709/250
(58) Field of Search .............................. 719/328, 310; 709/246, 250, 230, 227, 228; 370/360, 392, 466; 710/22

(56) References Cited

U.S. PATENT DOCUMENTS

| | | | |
|---|---|---|---|
| 5,537,417 A | | 7/1996 | Sharma et al. |
| 5,657,390 A | | 8/1997 | Elgamal et al. |
| 5,828,855 A | | 10/1998 | Walker |
| 5,941,950 A | | 8/1999 | Hwang et al. |
| 6,400,730 B1 | * | 6/2002 | Latif et al. .................. 370/466 |
| 6,459,698 B1 | * | 10/2002 | Acharya ...................... 370/392 |
| 6,594,712 B1 | * | 7/2003 | Pettey et al. .................. 710/22 |
| 6,693,901 B1 | * | 2/2004 | Byers et al. ................. 370/362 |
| 2002/0099827 A1 | | 7/2002 | Shah et al. |
| 2002/0099851 A1 | | 7/2002 | Shah et al. |

OTHER PUBLICATIONS

U.S. Appl. No. 09/377,914, filed Aug. 20, 1999, Shah et al.
U.S. Appl. No. 09/768,375, filed Jan. 22, 2001, Shah et al.
U.S. Appl. No. 09/768, 374, filed Jan. 22, 2001, Shah et al.
InfiniBand Architecture Specification, vol. 1, Release 1.0.a, Jun. 19, 2001. Copyright 1999, by InfiniBand Trade Association. Chapters 1–3, pp. 1–114.
InfiniBand Architecture Release v0.61, vol. 1, General Specifications, Jul. 6, 2001, Annex A: Sockets Direct Protocol, pp. 1–44.

* cited by examiner

Primary Examiner—Sue Lao
Assistant Examiner—Van Nguyen
(74) Attorney, Agent, or Firm—Kerry D. Tweet

(57) ABSTRACT

An intermediate layer referred to as InfiniSock that enables socket-based, legacy applications to access an InfiniBand® fabric, while also enabling new applications designed to take advantage of the InfiniBand® Architecture to function within a socket API environment. The InfiniSock layer supports the traditional AF_INET address family and also includes a novel address family referred to as AF_IB to support the InfiniBand® Architecture.

14 Claims, 3 Drawing Sheets

METHOD AND SYSTEM ENABLING BOTH LEGACY AND NEW APPLICATIONS TO ACCESS AN INFINIBAND FABRIC VIA A SOCKET API

FIELD OF THE INVENTION

The invention relates generally to networking and, more specifically, to a method and apparatus for enabling legacy applications to access an InfiniBand® network via a socket API while also enabling newer applications to take advantage of the features of the InfiniBand® Architecture.

BACKGROUND OF THE INVENTION

Computer networks typically utilize a TCP/IP (Transmission Control Protocol/Internet Protocol) protocol stack or equivalent protocol to provide addressing, as well as to provide error control and flow control. See, e.g., Internet Engineering Task Force Request For Comment (IETF RFC) 791, Internet Protocol, and IETF RFC 793, Transmission Control Protocol. The IP protocol will deliver a packet independently of all other packets; however, the IP protocol does not guarantee delivery of a packet. Among other things, the TCP protocol is utilized to provide guaranteed delivery of a packet. The TCP protocol performs addressing and also provides both error control and flow control. Because the IP protocol does not, by itself, guarantee delivery, thereby necessitating the implementation of a separate protocol (e.g., TCP) for reliable data transfer, there is increased overhead associated with TCP/IP software stack processing. Thus, the TCP/IP protocol stack is a significant source of delay in computer networks, resulting in increased packet latency.

For a web server, or server cluster, hosting an Internet site, the packet latency associated with the TCP/IP stack is particularly troublesome, especially for those Internet sites providing business services (e.g., sales, auctions, brokerage services, etc.). TCP/IP stack processing can lead to delays in communications between a web server and a client, as well as to delays in inter-processor communications amongst a group of servers in a cluster. Web servers and server clusters are becoming one of the largest sources of delay in Internet communications—with most of the server latency being attributed to TCP/IP stack processing—making the web server (or server cluster) the primary bottleneck in Internet transactions. Client-server communication delays resulting from such packet latency can lead to poor site performance (e.g., slow response time) and low availability, and a lack of client access may lead to frustrated customers and/or lost revenue.

One technology that has emerged in recent years to overcome the problems associated with TCP/IP stack processing delays in server clusters is the InfiniBand® Architecture (IBA). See *InfiniBand Architecture Specification Volume* 1, Release 1.0.a, June 2001, and *InfiniBand Architecture Specification Volume* 2, Release 1.0.a, June 2001. The InfiniBand® specifications describe an interconnect technology for interconnecting nodes—e.g., processor nodes and I/O (input/output) nodes—to form a system area network. IBA is designed around a point-to-point, switched I/O fabric. Further, IBA defines hardware transport protocols that support reliable messaging as well as memory manipulation semantics—e.g., Remote Direct Memory Access (RDMA)—without software intervention in the data movement path.

The InfiniBand® specifications do not, however, adequately define how a conventional socket API (Application Program Interface)—or equivalent programming interfaces—can take advantage of the IBA hardware features. Therefore, although IBA eliminates the overhead associated with traditional TCP/IP stack processing, legacy applications designed for use with the socket API cannot take advantage of the reliability and performance offered by IBA. Further, the socket API itself may not expose the features of IBA to newer applications that have been designed to take advantage of the IBA hardware.

DETAILED DESCRIPTION OF THE INVENTION

Figure 1:
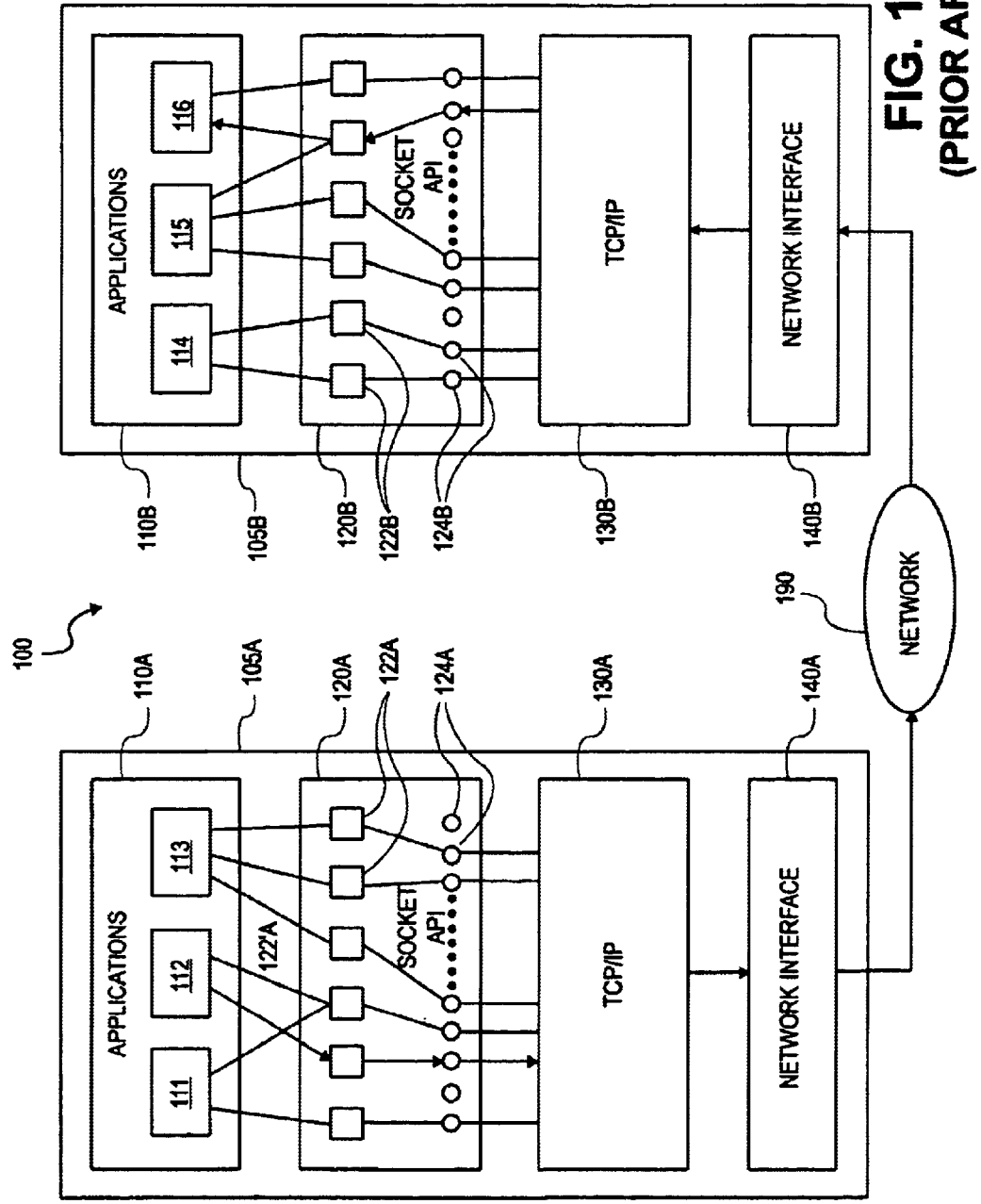
FIG. 1 shows a schematic diagram of a conventional networking system.

A conventional networking system 100 is illustrated in FIG. 1. The networking system 100 includes a first system 105a coupled with a second system 105b via a network 190. One of the systems 105a, 105b may comprise a client (e.g., first system 105a) and the other a server (e.g., second system 105b), and either of the systems 105a, 105b may be the client depending on which of the systems initiates communication. The network 190 may comprise any suitable network—e.g., the Internet, a Wide Area Network (WAN), a Local Area Network (LAN), or a Metropolitan Area Network (MAN)—or combination of networks, and the network 190 may exhibit any suitable network architecture.

The first system 105a includes one or more applications 110a, such as applications 111, 112, and 113. A socket API layer 120a provides an interface between the applications 110a and a TCP/IP protocol stack 130a. A network interface 140a—such as, for example, a network interface card (NIC)—connects the first system 105a with the network 190. Similarly, the second system 105b includes applications 110b, such as applications 114, 115, and 116. A socket API layer 120b interfaces the applications 110b with a TCP/IP protocol stack 130b, and a network interface 140b connects the second system 105b with network 190 that, in turn, couples the second system 105b with the first system 105a.

A packet of data associated with an application 110a (e.g., application 112) in the first system 105a flows (as denoted by arrows) from the application 110a to the socket API layer 120a. Applications 110a access services provided by the TCP/IP protocol stack 130a through the socket API layer 120a. A socket 122a provided by the socket API layer 120a is an abstraction though which an application 110a may send and receive data. To create an instance of a socket 122a, a protocol or address family must be specified for the socket. For TCP/IP, the AF_INET address family (also referred to as PF_INET) is specified, which indicates that the socket 122a will use the protocols and addresses from the Internet Protocol (IP) family.

A socket 122a (that uses the TCP/IP protocol family) is uniquely identified by an Internet address, an end-to-end protocol (e.g., TCP), and a port number of an associated port 124a. A port 124a is a pre-defined internal address that serves as a pathway between an application 110a and the TCP/IP protocol stack 130a and, typically, there may be 65,535 such addresses (numbered 1 through 65,535 with zero being reserved). Thus, the applications 110a need to specify an Internet address and a corresponding port 124a to use a specific socket 122a. It should be noted that a single socket abstraction 122a, as identified by a port number, can be referenced by multiple applications 110a on a the first computer system 110a. For example, the port 122a' is accessed by the application 111 as well as by the application 112. To send data to (and receive data from) an application on another system, such as the second system 105b, a socket 122a on the first system must be connected to another socket 122b of the second system 205b.

The socket API layer 120a then passes the packet to the TCP/IP protocol stack 130a for processing. The TCP/IP protocol stack 130a performs addressing and delivers the packet over the network 190 independently of other packets, while also performing error control and flow control. As noted above, the TCP/IP protocol stack 130a is a significant source of delay for transactions across the network 190, resulting in packet latency.

The packet is subsequently provided to the network interface 140a. The network interface 140a provides an interface between the first system 105a and the network 190, and the network interface 140a may both transmit data packets onto, and receive packets from, the network 190. The network interface 140a transmits the packet over the network 190 to the second system 105b—the packet having been properly addressed to the second system 105b in the TCP/IP stack 130a—and the second system 105b receives the packet at its network interface 140b. The packet is then passed to the TCP/IP protocol stack 130b of the second system 105b for processing. Based on the specified port 124b (as identified by a port number) at the socket API layer 120b, the packet is provided via a corresponding socket 122b to the appropriate application 110b (e.g., application 116) in the second system 105b.

As has been suggested, the above-described networking system 100 suffers from at least one significant drawback—i.e., packet latency resulting from the delay associated with TCP/IP stack processing. For a web server, or server cluster, hosting a heavily accessed Internet site, such packet latency may lower site performance and decrease availability. However, as noted above, interconnect technology such as IBA that eliminates the TCP/IP protocol stack does not adequately support socket API-based applications nor does it adequately expose IBA's hardware features through the socket API to applications adapted to take advantage of IBA.

Figure 2:
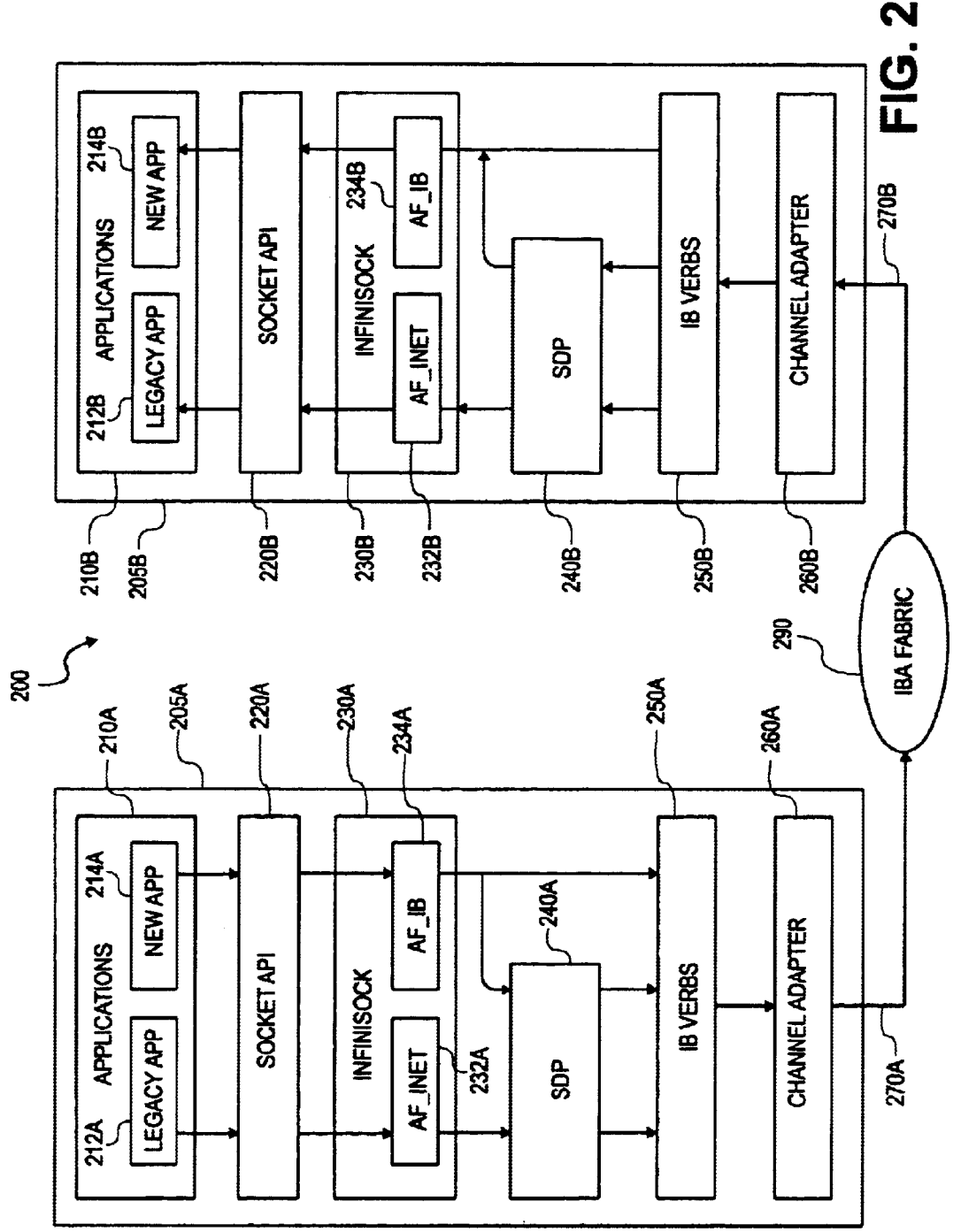
FIG. 2 shows a schematic diagram of a networking system utilizing an InfiniSock layer.

Referring to FIG. 2, a networking system 200 includes a first system 205a coupled with a second system 205b via an IBA fabric 290. The IBA fabric 290 comprises a switched fabric compatible with the InfiniBand® specifications, as set forth above. Each of the systems 205a, 205b may comprise a processor node, an I/O node, or a storage node.

The first system 205a includes applications 210a. The applications 210a may include one or more legacy applications 212a and one or more "new" applications 214a. A legacy application 212a comprises an application designed to utilize the socket API and traditional TCP/IP stack processing, whereas a "new" application 214a comprises an application designed to take advantage of the IBA hardware features. The first system 205a also includes a socket API layer 220a, as previously described. The socket API layer 220a is necessary to support the legacy applications 212a; however, the socket API layer 220a does not, by itself, adequately expose the features of the IBA fabric 290 to the new applications 214a.

To enable both legacy and new applications 212a, 214a to interface with the IBA fabric 290 in a socket API environment, an intermediate layer 230a is provided. The intermediate layer 230a lies below (and, generally, at the kernel level) the socket API layer 220a, and this intermediate layer 230a will be referred to herein as the InfiniSock layer. The InfiniSock layer 230a includes the AF_INET address family 232a for the socket API, as described above, as well as a novel address family for IBA, this address family being referred to as the AF_IB address family 234a. The InfiniSock layer 230a preserves socket API transport semantics (e.g., SOCK_STREAM) and enables legacy applications 212a to function with the IBA fabric 290 while also exposing IBA hardware features (e.g., RDMA) to new applications 214a that can take advantage of these features.

The InfiniSock layer 230 also performs a mapping function. For a legacy application 212a, the InfiniSock layer 230a provides a mapping function between the socket API layer 220a and an SDP layer 240a, as will be explained below. For a new application 214a, the InfiniSock layer 230a provides a mapping function between the socket API layer 220a and IB verbs 250a, which will also be explained below.

The first system 205a may also include a Sockets Direct Protocol (SDP) layer 240a, as previously noted. See *Infini-Band® Architectural Release v0.61, Volume 1— General Specifications, Annex A: Sockets Direct Protocol,* Jul. 6, 2001. The Sockets Direct Protocol provides a transport protocol that closely mimics TCP and also defines the packet format for data that is to be carried over the IBA fabric 290. The data path for legacy applications 212a will flow through the SDP layer 240a, whereas the data path for new applications 214a does not utilize the SDP layer 240a. In an alternative embodiment, as shown in FIG. 2, the data path for new applications 214a includes the SDP layer 240a.

The first system 205a may further include InfiniBand® (IB) verbs 250a and a channel adapter 260a. The channel adapter 260a terminates the link 270a with IBA fabric 290 and serves as an interface with the IBA fabric 290, both generating and receiving packets. The IB verbs 250a describe the interface between the channel adapter 260a and the operating system (not shown in FIG. 2) of first system 205a and, further, the IB verbs 250a describe the parameters necessary for configuring and managing the channel adapter 260a.

The second system 205b includes applications 210b, such as legacy applications 212b and new applications 214b. Second system 205b also includes a socket API layer 220b and an InfiniSock layer 230b, the InfiniSock layer 230b having an AF_INET address family 232b and the AF_IB address family 234b, as described above. The second system 205b further includes an SDP layer 240b, IB verbs 250b, and a channel adapter 260b coupled with IBA fabric 290 via a link 270b, all as described above. It should be understood that the second system 205b may not include an InfiniSock layer 230b and, further, that the second system 205b may include only legacy applications 212b or only new applications 214b.

Figure 3:
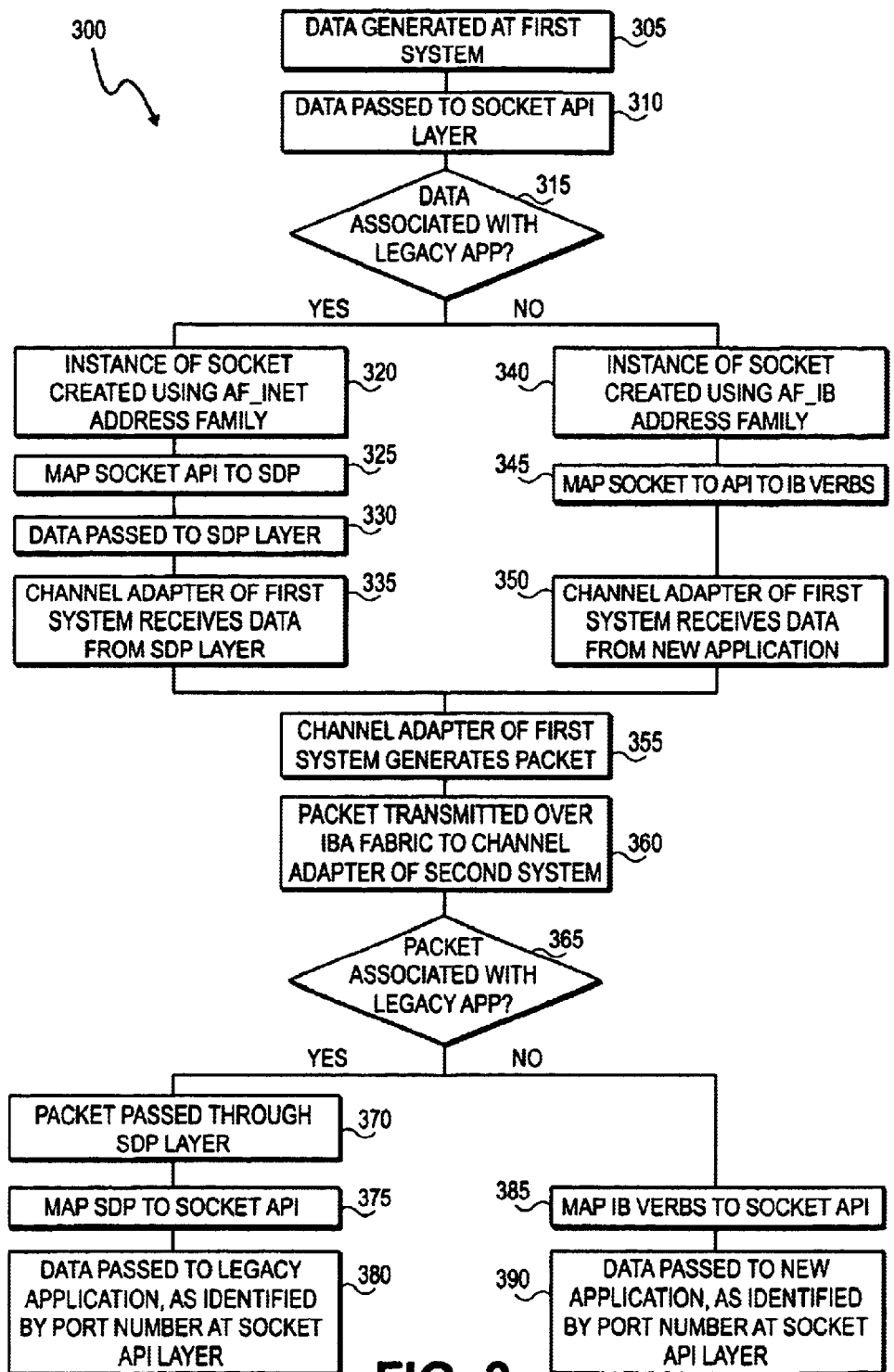
FIG. 3 is a flow chart illustrating a method of transmitting data from a first system of the networking system of FIG. 2 to a second system thereof.

The flow chart of FIG. 3 illustrates a method 300 of transmitting data from an application 210a of first system 205a over the IBA fabric 290 to an application 210b of second system 205b. Referring to FIG. 3, data is generated by an application 210a at the first system 205a, as denoted by reference numeral 305. The data created at the first system 205a is to be provided to an application 210b at second system 205b and, as shown at 310, the data is passed to the socket API layer 220a and a socket is created (if a pair of sockets does not already interconnect the applications that are exchanging the data).

Referring to reference numeral 315 in FIG. 3, if the data is associated with a legacy application 212a, an instance of a socket is created using the AF_INET address family 232a, which is shown at 320. A port number will be associated with the socket that has been created. A mapping is then performed to map the socket API layer 220a to the SDP layer 240a, as shown at 325. This mapping between the socket API layer 220a and the SDP layer 240a allows socket-based legacy applications 212a to interface with the SDP layer 240a and, hence, to communicate over the IBA fabric 290 without the overhead associated with the conventional TCP/IP protocol stack (see FIG. 1).

The data is then passed to the SDP layer 240a, which is shown at 330. As noted above, the SDP layer 240a defines a packet format and provides a "TCP-like" transport protocol that utilizes many of IBA's capabilities (e.g., RDMA). Subsequently, the channel adapter 260a receives the data from the SDP layer 240a, as denoted at 335.

Referring again to reference numeral 315 in FIG. 3, if the data is not associated with a legacy application 212a but, rather, is associated with a new application 214a, an instance of a socket is created using the AF_IB address family 234a, as shown at 340. A port number will be associated with the socket that has been created. As shown at 345, the InfiniSock layer 230a then performs a mapping function to map the socket API layer 220a to IB verbs 250a, as denoted by reference numeral. By way of example, the socket API parameter "Socket ( )" may be mapped to the "CreateCQ ( )" and/or "CreateQP ( )" parameters of IBA. Use of the AF_IB address family 234a in conjunction with the mapping between the socket API layer 220a and the IB verbs 250a directly exposes the IB verbs 250a—and, accordingly, the native features of IBA—to the new application 214a, thereby enabling the new application 214a to take advantage of IBA's hardware features (e.g., hardware transport protocols with no software intervention, reliable messaging, RDMA).

The channel adapter 260a can then receive the data from the new application 214a via the socket API layer 220a, which is shown at reference numeral 350. In an alternative embodiment, as shown in FIG. 2, although a socket is created using the AF_IB address family 234a, the data may still be passed to the SDP layer 240a if the TCP-like protocol and packet format defined by the SDP layer 240a are desired. In this embodiment, a mapping between the socket API layer 220a and the SDP layer 240a would be performed.

When the channel adapter 260a of the first system 205a has received the data, the channel adapter 260a generates a packet containing the data, as shown at 355. The packet is then transmitted over the IBA fabric 290 to the channel adapter 260b of the second system 205b, as illustrated by reference numeral 360.

Referring to reference numeral 365 in FIG. 3, if the packet is associated with a legacy application 212b, the packet is passed to the SDP layer 240b, as shown at 370. Referring to reference numeral 375, a mapping between the SDP layer 240b and the socket API layer 220b is performed. As shown by reference numeral 380, the data contained in the packet is then provided to the legacy application 212b, the legacy application 212b being identified by a corresponding port number at the socket API layer 220b. Referring again to reference numeral 365, if the packet is not associated with a legacy application 212b but, rather, is associated with a new application 214b, a mapping from IB verbs 250b to the socket API layer 220b is performed, as shown at 385. Referring to reference numeral 390, the data is then provided to the new application 214b, as identified by a corresponding port number at the socket API layer 220b.

InfiniBand® is a relatively new technology and new applications designed specifically for IBA are only beginning to emerge, whereas legacy applications designed for a socket API are ubiquitous and their use will continue well into the future. The InfiniSock layer described herein—which supports the conventional AF_INET address family and also provides a mapping between socket API and SDP—enables these socket-based, legacy applications to function in an IBA environment. Further, the InfiniSock layer defines a new AF_IB address family that, in conjunction with a mapping between the socket API and IB verbs, exposes the native features of IBA to those newer applications designed to take advantage of IBA's hardware features.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method of communication over an InfiniBand (IB) network comprising:
   receiving data from an application;
   determining whether the application is a legacy application or a new application:
   creating a socket;
   associating the socket with a first address family and performing a mapping between a socket application programming interface (API) and sockets direct protocol (SDP) layer if the application is a legacy application; and
   associating the socket with a second address family and performing a mapping between the socket API and an IB verb if the application is a new application.

2. The method of claim 1, further comprising providing the data to a channel adapter for transmission over the IB network.

3. The method of claim 1, wherein the application is a new application, the act of performing a mapping between the socket API and an IB verb comprising performing a mapping between the socket API and the SDP layer.

4. A system comprising:
   a channel adapter coupled with an InfiniBand (IB) network, the channel adapter to receive data from an application;
   a socket application programming interface (API) to create a socket; and
   a second layer to provide an interface between the socket API and the channel adapter, the second layer to determine whether the application is a legacy application or a new application,
      associate the socket with a first address family and perform a mapping between the socket API and a sockets direct protocol (SDP) layer if the application is a legacy application, and
      associate the socket with a second address family and perform a mapping between the socket API and an IB verb if the application is a new application.

5. The system of claim 4, the channel adapter to transmit the data to the IB network.

6. The system of claim 4, the second layer to provide a mapping between the socket API and the SDP layer for a new application.

7. An article of manufacture comprising:
a machine accessible medium providing content that, when accessed by a machine, causes the machine to
receive data from an application;
determine whether the application is a legacy application or a new application;
create a socket;
associate the socket with a first address family and perform a mapping between a socket application programming interface (API) and sockets direct protocol (SDP) layer if the application is a legacy application; and
associate the socket with a second address family and perform a mapping between the socket API and an InfiniBand (IB) verb if the application is a new application.

8. The article of manufacture of claim 7, wherein the content, when accessed, further causes the machine to provide the data to a channel adapter for transmission over an IB network.

9. The article of manufacture of claim 7, wherein the application is a new application and the content, when accessed, further causes the machine to perform a mapping between the socket API and the SDP layer.

10. A network comprising:
an InfiniBand (IB) fabric;
a first system coupled with the IB fabric, the first system including
a channel adapter coupling the first system with the IB fabric, the channel adapter to receive data from an application resident on the first system,
a socket application programming interface (API) to create a socket, and
a second layer to provide an interface between the socket API and the channel adapter, the second layer to determine whether the application is a legacy application or a new application,
associate the socket with a first address family and perform a mapping between the socket API and sockets direct protocol (SDP) layer if the application is a legacy application, and
associate the socket with a second address family and perform a mapping between the socket API and an IB verb if the application is a new application; and
a second system coupled with the IB fabric.

11. The network of claim 10, the channel adaptor to transmit the data over the IB fabric to the second system.

12. The network of claim 10, the second system including a legacy application.

13. The network of claim 10, the second system including a new application.

14. The network of claim 10, the second system comprising:
a channel adapter coupling the second system with the IB fabric, the channel adapter to receive data from an application resident on the second system;
a socket API to create a socket; and
a second layer to provide an interface between the socket API and the channel adapter, the second layer to determine whether the application is a legacy application or a new application,
associate the socket with a first address family and perform a mapping between the socket API and an SDP layer if the application is a legacy application, and
associate the socket with a second address family and perform a mapping between the socket API and an IB verb if the application is a new application.

* * * * *